[2,985,600]

Patented May 23, 1961

2,985,600
POLYMERIC SANITARY COATING SYSTEM

Naaman F. Barr, Pine Township, Allegheny County, and Frank G. Alster, Baldwin, Pa., assignors to American Marietta Company, Stoner-Mudge Co., Division, Chicago, Ill., a corporation of Illinois No Drawing. Filed Aug. 22, 1957, Ser. No. 679,772

8 Claims. (Cl. 260—19)

This invention relates to the production of resinous polymers for coating compositions and more particularly to improved phenol formaldehyde-drying oil condensates. The invention generally relates to the preparation of coating compositions which combine the good oil, fat and chemical resistance of thermosetting phenolic resins with the good flexibility of oleoresinous varnishes. This application is a continuation in part of our application Serial No. 469,552, filed November 17, 1954, now abandoned.

This invention particularly relates to the production of oleoresinous varnishes suitable as sanitary coatings possessing enhanced insolubility. An outstanding feature of the invention is the provision of sanitary can coatings of the oleoresinous varnish type which are essentially free from flavor and taste imparting components.

What are known in the trade as "oleoresinous varnishes" are characterized by fast drying on exposure to air or upon baking at elevated temperatures (10 min. at 400°–410° F.), and are noted for excellent flexibility but limited resistance to many solvents and some food products.

Oleoresinous phenolic varnishes are produced by condensing a phenol, formaldehyde and a drying oil (such as China-wood oil, linseed oil, or oiticica oil). As the phenol constituent of these known oleoresinous phenolic varnishes, it is known to employ phenol itself and also di-functional phenols such as p-phenylphenol, o-cresol, p-tertiary butyl phenol or combinations thereof. The resulting coating composition, when baked on tin plate or black plate, for example, has excellent adhesion and flexibility, but it is excessively soluble when tested with acetone. More particularly, these oleoresinous varnishes are inadequately resistant to organic solvents and this inadequacy is particularly apparent when the phenol employed is a di-functional phenol. The inadequate solvent resistance continues to exist, although it is not as apparent when the phenol employed is tri-functional, e.g., phenol itself.

A further difficulty of known oleoresinous varnishes, when these varnishes are employed as sanitary can coatings, is the difficulty of preventing undesirable flavor and odor which are picked up by the contents of the can due to contact between the coating and the products packaged within the can. Phenolic combinations generally, when condensed in the forms of an oleoresinous varnish, contain low molecular weight components which are soluble in water and food oils and which will, therefore, dissolve in small quantity in the materials which are stored within the can. An important feature of the invention is the production of an oleoresinous varnish having the flexibility and insolubility necessary for the provision of an effective sanitary can coating coupled with the substantial elimination in the coating of soluble flavor and odor imparting components.

What are known in the trade as "thermosetting phenolic resinoids" are condensation products of polyfunctional phenolic compounds, including p,p'-dihydroxy diphenyl 2,2'-propane, p,p'-dihydroxy diphenyl methane, and resorcinol, or mixtures thereof, reacted, for example, with formaldehyde or with formaldehyde-yielding substances, in the presence of an alkaline catalyst, such as ammonium hydroxide. When such condensation products are filmed on a surface and heated to temperatures in the range of 350°–400° F. for as little as 5–10 minutes, an infusible, insoluble film is formed, characteristic of a thermosetting resin. Although such a film has excellent resistance to water, oils, fats, food products and solvents generally, it has very poor flexibility, and consequently the film weights are limited to a maximum of 2 milligrams per square inch, and are preferably limited to 1.8 milligrams per square inch, to minimize the effects of inherent inflexibility. It is difficult to apply such thin films by roller coating, and the thinness of the film causes it to rupture easily, particularly when applied to a metal sheet which must subsequently be fabricated into can ends or container closures.

It has long been recognized that a combination of the best properties of both the oleoresinous and the thermosetting phenolic coatings, would yield a valuable coating composition for use in food cans and closures and the like, where a combination of flexibility and resistance to water, oils, fats, and food and beverage products is essential.

However, the objective is difficult to achieve, because the rapid conversion of a thermosetting phenolic resinoid to its infusible, insoluble state upon heating prevents use of the standard oil treating process for correcting inflexibility, i.e., heating the resin with oil to 350–525° F., for the necessary period of time, without formation of any gel or infusible, insoluble resinoid. A further difficulty arises from the fact that reactive oils such as China-wood oil will gel rapidly, in about 10–25 minutes, when heated to a temperature range in which reaction is to occur, about 475–525° F.

In accordance with the invention the desired objective is obtained by first reacting a polyfunctional dihydroxy phenolic compound with an unsaturated drying oil containing at least two double bonds in an acid radical thereof or the fatty acids derived therefrom, or mixtures thereof at temperatures from about 250–525° F. until the two reactants are completely compatible, as evidenced by lack of crystallization and clouding of a supercooled bead sampled therefrom. The initial reaction which may require from ½ hour to 10 hours, should be stopped as soon as a supercooled bead (a sample drop of the reaction product, cooled to 40–50° F.) shows complete compatibility. The oil-phenol type reaction product thus formed is then cooled to about 150° to 160° F., and then an amount of an aldehyde or a depolymerizable polymer of an aldehyde or mixtures thereof, equivalent to from 0.8 to 1.5 moles of monomeric aldehyde for each mole of phenolic compound in the reaction product is added, and at the same time a suitable catalyst is preferably but not necessarily added. The resultant mixture is then heated and held at substantially 170° to 200° F. for at least 20 minutes, and is then vacuum distilled to dehydrate and polymerize the resin until it has a suitable cure time, the dehydration of the resin serving progressively to decrease its cure time. A suitable cure time, such as 12 to 45 seconds at 375° F., is tested by filming the composition on a hot plate at a given temperature, such as 375° F., and noting the time elapsed before the film gels as indicated by loss of liquid flow when stirred with a spatula. For purposes of forming a coating composition the resultant resin is then thinned to a desired viscosity with suitable solvents.

The bead test referred to above in the reaction of the polyfunctional dihydroxy phenolic compound with the unsaturated oil or fatty acid derived therefrom is important to the achievement of a resinous product meeting the rigid requirements of a sanitary can coating. If the bead test fails to show a clear bead, the resinous product will not be homogeneous and it will not be satisfactory. When the supercooled bead is free from crystallization and clouding, it is light yellow in color.

The polyfunctional dihydroxy phenolic component which is used in the initial reaction specified above includes mononuclear phenols and dinuclear phenols. Among the mononuclear dihydroxy phenols such as resorcinol, catechol, and hydroquinone, resorcinol is preferred. The dinuclear phenols are those in which the phenol groups are not fused to one another as for example in the preferred compound bisphneol A (also identified as either p,p'-dihydroxy, diphenyl 2,2'-propane or 2,2'-bis (p-hydroxy phenyl) propane. Bisphenol A is tetrafunctional and is representative of tetrafunctional dinuclear phenolic compounds in which two monohydric phenolic groups are linked together through an intervening divalent alkyl group. The polyfunctional dihydroxy dinuclear phenols may also be trifunctional. An illustration of a trifunctional dinuclear dihydroxy phenol is the reaction product of 1 mole of phenol, 1 mole of ortho cresol, and 1 mole of acetone which yields p,p'-dihydroxy m-methyl diphenyl 2,2'-propane.

It is desired to point out that the mononuclear phenols, such as resorcinol, are not considered to be the equivalent of the dinuclear phenols. The dinuclear phenols are substantially superior to the mononuclear phenols in the provision of a sanitary coating composition which is essentially free from soluble odor and taste imparting components. Apparently, the dinuclear phenols when reacted with the unsaturated oil to the point of complete compatibility (clear bead test) produce intermediates which, when reacted with an aldehyde, result in more insolubility at lower molecular weight than in the case of the mononuclear phenols reacted under the same conditions. It has been observed that at the desired stage of reaction, the compatible reaction product of oil and phenolic body, in the instance of the polynuclear dihydroxy phenol, yields products which are more uniform and superior after condensation with aldehydes for application as substantially taste free sanitary coatings.

It is desired to stress that in accordance with the present invention, the order of steps specified is critical and the use of dihydric polyfunctional phenolic compounds is also critical, these phenolic compounds being employed in the substantial absence of other phenolic compounds which are not dihydric and polyfunctional.

The drying oil constituent may include unsaturated drying oils such as fast drying oils having 2 or more conjugated double bonds in an acid radical of the oil molecule, e.g., China-wood oil, oiticica oil and dehydrated castor oil; medium drying oils having 3 or more non-conjugated double bonds in an acid radical of the oil molecule, such as perilla oil, linseed oil, soy bean oil and the glycerides of the clupanodonic acid of fish oils; and semi-drying oils having 2 non-conjugated double bonds in an acid radical thereof such as poppyseed, rapeseed, and sunflower seed oils. The fatty acids derived from the aforementioned oils may also be employed.

When employing semi-drying oils, it is desirable to employ higher temperatures, such as temperatures in the range of 400° F.–450° F. The mixture being heat-reacted is blanketed with an inert gas and the reaction takes about 2 hours. The mixture should be carefully watched so that cooking is stopped as soon as the reactants are completely compatible.

The drying oil-phenolic compound ratio for purposes of the initial reaction are in the range of 80/20 to 33/67 by weight. For purposes of the second reaction (reaction product/aldehyde) or resin condensation, the aldehyde may be, for example, formaldehyde or its depolymerizable polymers, which yield formaldehyde, or mixtures thereof, and are preferably in a ratio of from 0.8 to 1.5 moles of monomeric formaldehyde for each mole of phenolic compound in the initial reaction product.

Catalysts for the resin condensation, while not essential, are preferably used to speed the reaction and are selected from alkaline materials such as ammonium hydroxide, sodium hydroxide, calcium oxide and zinc oxide, used in proportions of about 5 to 20% of the weight of phenolic compound in the initial reaction product.

The completed resinoid is readily thinned with conventional coating solvents to a solids content in the range of about 25 to 55% solids to obtain coating viscosities in the range of about 30–50 seconds, No. 4 Ford cup, at 80° F. and is then suitable for application by dip, brush, roll, spray and other conventional application means. Examples of such solvents are ether alcohols such as "Cellosolve" and "Butyl Cellosolve," ketones such as methyl ethyl ketone, methyl isobutyl ketone and isophorone, and aromatic hydrocarbons such as benzene, toluene, and xylene. Commercial mixed aromatic hydrocarbon solvents such as those having properties similar to benzene, toluene, and xylene, may also be used, individually or in combination. Pigments, dyes and other non-reactants may be added to the composition for decorative purposes and the like without materially affecting the significant characteristics of the composition.

The coating compositions of the invention as described above are characterized by good adhesion to metal substrates such as blackplate, tinplate and aluminum, and when baked thereon at temperatures in the range of 300 to 450° F., for periods of 5 to 30 minutes, produce coating films having film weights varying from 0.5 to 6.0 milligrams per square inch and exhibiting good flexibility and excellent resistance to sulfide staining, softening by oils, and deterioration by food and beverage products. The coatings of the invention are useful as interior and exterior coatings, as single coatings, size coatings and finish coatings, and in multiple-coat systems involving successive baking operations.

The coating compositions of the invention produced from polyfunctional dinuclear phenols uniquely exhibit unusual freedom from odor and taste imparting components.

Typical illustrative examples of coating compositions of the invention are as follows:

EXAMPLE I 490 grams of China-wood oil and 509 grams of p,p'-dihydroxy diphenyl 2,2'-propane are mixed and heated to 325° F. in 40 minutes and are held at that temperature for 4 hours. The reaction product thus formed is then cooled to 150° F., and 53.0 grams of paraformaldehyde and 40.0 grams of a 28% aqueous solution of ammonium hydroxide are added. The latter mixture is heated to 180° F. in about 15 to 20 minutes, and held at that temperature for 30 minutes. It is then vacuum distilled under 26 to 28 inches vacuum until the resin has a cure time of substantially 20 seconds at 375° F. The resin is then cooled by adding 1.5 times its weight of a solvent (33% xylene, 27% "Cellosolve" and 40% "Solvesso #100"). The resultant composition has a solids content of 38 to 42% and a viscosity in a #4 Ford cup of 35 to 45 seconds at 80° F.

Example I was repeated with the sole change being the replacement of the p,p'-dihydroxy diphenyl 2,2'-propane of the example within, one instance, an equal weight of p,p'-dihydroxy m,m'-dimethyl diphenyl 2,2'-propane and with, in a second instance, an equal weight of p,p'-dihydroxy m-methyl diphenyl 2,2'-propane. In each instance, substantially identical results were achieved.

EXAMPLE II 670 grams of China-wood oil and 330 grams of p,p'-dihydroxy diphenyl methane are mixed and heated to 450° F. in 30–45 minutes and held at that temperature for 3 hours. The reaction product thus formed is cooled to 150° F., and 43.5 grams of paraformaldehyde and 35.0 grams of a 28% aqueous solution of ammonium hydroxide are added. The latter mixture is heated and vacuum distilled as in Example I, and then the resin is thinned with 1.5 times its weight of solvent consisting of 60% xylene and 40% "Cellosolve" to obtain the solids content and viscosity stated in Example I.

EXAMPLE III 330 grams of China-wood oil and 670 grams of p,p'-dihydroxy diphenyl 2,2'-propane are mixed and heated to 525° F. in 20–40 minutes and held at that temperature for ½ hour. The reaction product thus formed is cooled to approximately 150° F., and 88.0 grams of paraformaldehyde and 3.5 grams of 98% $H_2SO_4$ are added. The latter mixture is heated and vacuum distilled as in Example I, and then the resin is thinned with 1.5 times its weight of solvent consisting of 60% xylene, 20% "Cellosolve," 10% isophorone and 10% methyl isobutyl ketone, to obtain the solids content and viscosity stated in Example I.

EXAMPLE IV 500 grams of linseed oil and 500 grams of p,p'-dihydroxy diphenyl 2,2'-propane are mixed and heated to 475° F. in 20–40 minutes and held at that temperature for 4 hours. The reaction product thus formed is cooled to 150° F., and 66 grams of paraformaldehyde and 50 grams of 28% ammonium hydroxide solution are added. The latter mixture is heated to 200° F. in 10–20 minutes and held at that temperature for 30 minutes, and then is vacuum distilled as in Example I to a cure time of 12–20 seconds at 375° F. The resin is then thinned with 1.5 times its weight of solvent consisting of 30% xylene, 30% "Solvesso #100," 20% isophorone and 20% "Cellosolve" to obtain the solids content and viscosity stated in Example I.

EXAMPLE V 560 grams of fatty acids of China-wood oil and 440 grams of p,p'-dihydroxy diphenyl 2,2'-propane are mixed and heated to 525° F. in 20–40 minutes and held at that temperature for one hour. The reaction product thus formed is cooled to 150° F., and 58 grams of paraformaldehyde and 80 grams of 28% ammonium hydroxide solution are added. The latter mixture is heated in 10–20 minutes to 190° F. and held there for 30 minutes and then vacuum distilled as in Example I to a cure time of 12–18 seconds. The resin is then thinned with 1.5 times its weight of solvent consisting of 60% "Solvesso #100" and 40% "Cellosolve" to obtain the solids content and viscosity stated in Example I.

EXAMPLE VI 500 grams of oiticica oil and 500 grams of p,p'-dihydroxy diphenyl 2,2'-propane are mixed and heated to 500° F. in 20–40 minutes and held at that temperature for 3 hours. The reaction product thus formed is cooled to 150° F., and 53 grams of paraformaldehyde and 25 grams of anhydrous calcium oxide are added. The latter mixture is heated and vacuum distilled as in Example V, and then the resin is thinned with 1.5 times its weight of solvent consisting of 60% "Solvesso #100," 20% isophorone and 20% "Cellosolve" to obtain the solids content and viscosity stated in Example I.

EXAMPLE VII 1000 grams of China-wood oil and 1000 grams of p,p'-dihydroxy diphenyl 2,2'-propane are mixed and heated to 450° F. in 20–40 minutes and held at that temperature for about 4 hours. The reaction product thus formed is cooled to 150° F., and 197 grams of paraformaldehyde and 200 grams of 28% ammonium hydroxide are added. The latter mixture is heated and vacuum distilled as in Example V, and then the resin is thinned with 1.5 times its weight of solvent consisting of 50% xylene and 50% "Cellosolve" to obtain the solids content and viscosity stated in Example I.

EXAMPLE VIII 600 grams of China-wood oil and 400 grams of resorcinol are mixed and heated to 400° F. in 30–45 minutes and held at that temperature for about 4 hours. The reaction product thus formed is cooled to 150° F. and 100 grams of paraformaldehyde and 30 grams of 28% ammonium hydroxide are added. The latter mixture is heated to 200° F. in 10–20 minutes and held at that temperature for 30 minutes and then is vacuumed distilled as in Example I to a cure time of 12–20 seconds at 375° F. The resin is then thinned with 1.5 times its weight of a solvent consisting of 50% xylene and 50% "Cellosolve" to obtain the solids content and viscosity stated in Example I.

For purposes of comparison, examples of an oleoresinous varnish and thermosetting phenolic resinoid of the prior art are described as follows:

*Oleoresinous varnish.*—A mixture of 0.7 to 1.0 mole of formaldehyde as a 37% aqueous solution, 0.25 to 1.0 mole of ammonium hydroxide, and one mole of o-cresol is reacted at 180–200° F., for ½ to 1 hour; the resultant supernatant fluid is removed, and the remaining resinous mass is first acidified to a pH of 3–4 and then repeatedly washed with water until the pH reaches 6; the resinous mass is then dehydrated under vacuum and polymerized until the resultant resin has a melting point of 110–145° F. One hundred pounds of resin thus formed are reacted with from 6 to 18 gallons of China-wood oil by heating the mixed reactants to 375–450° F. and holding them at that temperature for ½ to 4 hours. The reaction product is then cooled to approximately 325° F., and thinned to about 50–60% solids with aromatic hydrocarbon solvents such as benzene, toluene or xylene.

*Thermosetting phenolic resinoid.*—A mixture of 1 mole of p,p'-dihydroxy diphenyl 2,2'-propane, 1 mole of formaldehyde (37% aqueous solution), and a quantity of an aqueous solution of 28% ammonium hydroxide equal to 10% of the phenol weight, is heated in 20 minutes to 180° F. and held at that temperature for 30 minutes. The resinoid thus produced is then vacuum distilled until it has a cure time of 30 seconds at 375° F., and is then cooled and thinned with suitable solvents to the desired viscosity for coating purposes.

Samples of the coating compositions of Examples I, III, and IV were roller coated at different thicknesses on electrolytic tinplate (0.25 lb., 85 lb. base weight) and baked 10 minutes at about 400° F., and samples of the above-described oleoresinous varnish and thermosetting phenolic resinoid were similarly coated on such tinplate and baked thereon, for purposes of comparing the qualities of the baked coatings. Tests of the coated specimens are described as follows:

(1) *Fabrication.*—The coated tinplate specimen is drawn, threaded, curled and knurled into a screw cap, and immersed for one minute in an acidified copper sulfate solution, to bring out more clearly any places where the coating has failed and left bare metal exposed. The cap is then inspected and the coating rated on a scale of 0 (complete failure) to 30 (perfect).

(2) *Product resistance.*—The coated tinplate specimen is placed in a container filled with spinach through which oxygen has been bubbled, and the air remaining in the container is twice evacuated and replaced with pure oxygen before sealing the container. The container is then steam processed for 60 minutes at 240° F., and allowed to stand for several days. It is then opened and the coating inspected for "blush" and loss of adhesion of the coating, and for corrosion of the metal substrate. The rating is on a scale of 0 (complete failure) to 100 (perfect).

(3) *Sulfide staining resistance.*—The coated tinplate specimen is inserted into a synthetic meat testing mixture and steamed in an autoclave for two hours at 250° F. The specimen is then removed and the coating inspected for staining or darkening. The rating is on a scale of 0 (complete failure) to 10 (perfect).

The following table shows the results of testing the indicated coated specimens:

*Table of comparative tests of coatings*

| Coating (on tinplate) | Coating Weight (mg./sq. in.) | Fabrication test (0-30) | Product Resistance test (0-100) | Sulfide Staining test (0-10) |
|---|---|---|---|---|
| Example I | 2 | 18 | 96 | 7 |
| Do | 4 | 22 | 96 | 8 |
| Do | 6 | 14 | 89 | 7 |
| Example III | 4 | 11 | 88 | 4 |
| Example IV | 4 | 17 | 89 | 4 |
| Oleoresinous Varnish | 6 | 22 | 73 | (softened) |
| Thermosetting phenolic resinold | 2 | 12 | 88 | 6 |
| Do | 4 | 0 | | |

While we have described present preferred embodiments of the invention and methods of practicing the same, it will be recognized that the invention is not limited thereto but may be otherwise variously embodied and practiced within the scope of the following claims.

We claim:

1. A method for producing a resinoid adapted for use as a sanitary can coating comprising (1) reacting a material selected from the group consisting of unsaturated drying oils having at least two double bonds in a fatty acid radical thereof, fatty acids derived from said drying oils and mixtures thereof, with from 20 to 67% by weight of dihydric phenolic compound selected from the group consisting of trifunctional and tetrafunctional mononuclear phenols containing two phenolic hydroxyl groups and trifunctional and tetrafunctional dinuclear phenolic compounds in which two monohydric phenolic groups are linked together through an intervening divalent alkyl group based on the combined weight of said material and said phenolic compound, at a temperature from 250 to 525° F., until the two reactants are completely compatible, as evidenced by lack of crystallization and clouding of a supercooled bead sampled therefrom (2) reacting the reaction product of reaction (1) with monomeric formaldehyde in proportions of 0.8 to 1.5 moles of monomeric formaldehyde for each mole of phenolic compound in the reaction product of reaction (1), at substantially 170 to 200° F. for at least 20 minutes, and (3) dehydrating the resin produced by reaction (2).

2. A method as recited in claim 1 in which said phenolic compound is a dinuclear tetrafunctional phenolic compound.

3. A resinoid produced as recited in claim 1.

4. A resinoid as recited in claim 3 in which said phenolic compound is p,p'-dihydroxy diphenyl 2,2'-propane.

5. A resinoid as recited in claim 3 in which said drying oil is China-wood oil.

6. A resinoid as recited in claim 3 in which said drying oil is linseed oil.

7. A resinoid as recited in claim 3 in which said drying oil is oiticica oil.

8. A metal article having the resinoid of claim 1 coated and baked thereon.

References Cited in the file of this patent

UNITED STATES PATENTS

| | | |
|---|---|---|
| 1,677,417 | Turkington | July 17, 1928 |
| 1,988,615 | Turkington | Jan. 22, 1935 |
| 1,988,616 | Turkington | Jan. 22, 1935 |
| 2,070,148 | Turkington | Feb. 9, 1937 |
| 2,076,507 | Turkington | Apr. 6, 1937 |
| 2,083,040 | Shuey | June 8, 1937 |
| 2,101,791 | Ellis | Dec. 7, 1937 |
| 2,588,821 | Geiger | Mar. 11, 1952 |
| 2,744,882 | Bender et al. | May 8, 1956 |

FOREIGN PATENTS

| | | |
|---|---|---|
| 401,309 | Great Britain | Nov. 9, 1933 |